United States Patent [19]

Nitta et al.

[11] Patent Number: 4,725,217
[45] Date of Patent: Feb. 16, 1988

[54] COMPACTOR MACHINE

[75] Inventors: Masaru Nitta, Akashi; Kouichi Beppu, Hyogo, both of Japan

[73] Assignee: Kabushiki Kaisha Kobe Seiko Sho, Kobe, Japan

[21] Appl. No.: 880,740

[22] Filed: Jul. 1, 1986

[30] Foreign Application Priority Data

| Jul. 1, 1985 | [JP] | Japan | 60-100928[U] |
| Jul. 23, 1985 | [JP] | Japan | 60-113425[U] |
| Oct. 17, 1985 | [JP] | Japan | 60-232945 |
| Nov. 9, 1985 | [JP] | Japan | 60-251719 |

[51] Int. Cl.$^4$ .............. B29C 43/46; B29C 33/42; B29C 33/54
[52] U.S. Cl. .............. 425/296; 425/308; 425/316; 425/324.1; 425/335; 425/406
[58] Field of Search .............. 425/237, 308, 313, 289, 425/294, 296, 308, 363, 383, 394, 325, 335, 324.1, 328, 316, 403, 406, 440, 313, 230, 79, 367; 264/118, 119, 140, 142, 151, 319, 297.5, 297.6, 297.7, 297.9; 75/0.5 A, 0.5 B; 266/122

[56] References Cited

U.S. PATENT DOCUMENTS

| 422,818 | 3/1890 | Mills | 241/167 |
| 2,662,246 | 12/1953 | Klugh et al. | 425/335 |
| 2,717,419 | 9/1955 | Dickey | 425/237 |
| 2,739,546 | 3/1956 | Bonnafoux | 425/308 |
| 3,561,050 | 2/1971 | Danforth | 425/230 |
| 3,879,157 | 4/1975 | Heesen | 100/176 |
| 3,897,183 | 7/1975 | Hofman et al. | 425/237 |
| 4,033,559 | 7/1977 | Pletsch | 75/0.5 BA |
| 4,411,611 | 10/1983 | Ohtawa et al. | 425/237 |
| 4,462,526 | 7/1984 | Pumont et al. | 425/294 |

FOREIGN PATENT DOCUMENTS

| 2333026 | 1/1974 | Fed. Rep. of Germany . |
| 663324 | 8/1929 | France . |
| 897887 | 4/1945 | France . |
| 1579745 | 8/1969 | France . |
| 231214 | 5/1944 | Switzerland . |
| 1456187 | 11/1976 | United Kingdom . |

Primary Examiner—Willard Hoag
Attorney, Agent, or Firm—Oblon, Fisher, Spivak, McClelland & Maier

[57] ABSTRACT

A compactor machine which includes a pair of forming rolls having annular peripheral grooves and projections alternately for thereby providing forming paths therebetween, a scraper mechanism mounted on an outlet side of the compaction rolls and being movable toward and away from the forming paths to thereby close and open the latter, and a feeder mechanism including a downwardly tapered throat providing an inner peripheral wall substantially merging with the peripheral surfaces of the compaction rolls.

8 Claims, 39 Drawing Figures

COMPACTOR MACHINE

BACKGROUND OF THE INVENTION

1. Field of the Invention

The present invention relates to a compactor machine for compressively forming granular materials into a desired shape, and more particularly to a compactor machine including at least one pair of compaction rolls.

2. Description of the Prior Art

It is a well known method to form granular materials into pieces of compacted material or so-called briquets by compacting the same by a pair of compaction rolls into elongate intermediate strips and then cutting the latter in a succeeding process.

This method is broadly utilized for preparing and/or processing granular or particulate materials for use in various industrial fields, e.g. chemical, food, pottery, mine, iron and steel making, particularly in making pellets for a blast furnace, and the like.

One known apparatus for performing such method is, for instance, a compactor machine. A first type of compactor machine includes a pair of cooperative forming or compaction rolls, in which a mass of granular material is fed continuously into forming paths defined between two rolls to thereby form a number of elongate intermediate strips, and then the strips are transversely cut into pieces of compacted material, i.e. briquets. There is a second type of prior compactor machine which includes a pair of compaction rolls having a plurality of forming recesses or pockets on peripheries thereof. The two rolls rotate cooperatively to jointly compact granular materials therebetween and thus directly form a plurality of briquets.

U.S. Pat. No. 4,033,559 discloses a compactor machine of the first type in which an intermediate flat strip having been formed between the pair of compaction rolls is horizontally or transversely split into strips by a slitter unit and then thus split strips are vertically cut into small pieces by a breaker unit. Provision of the slitter and breaker units is effective in exerting a stable cutting operation. However, it is disadvantageous in view of a compact or simple construction, since the two units are provided separately from the machine.

In view of the cutting means of the intermediate compacted material, a rotary hammer as disclosed, for instance, in Japanese Patent Laid-Open Publication No. 59-153599, and a rotary shear blade as disclosed, for instance, in U.S. Pat. No. 4,076,520 have been proposed. The rotary hammer strikes the intermediate strips to separate abruptly the latter into briquets with an impact force created by striking motion thereof. Thus separated briquets tend to have a decreased firmness due to a mechanical stress caused by such an abrupt impact force. Therefore only briquets of an increased brittleness are produced. These briquets have rough surfaces and thus a low surface density. Such surface become disadvantageous especially when reduced metal such as sponge iron is formed into briquets for the purpose of prevention of re-oxidization thereof.

The rotary shear blade also cuts the intermediate material into briquets with its shearing force, which also results in a similarly rough surface of the briquets.

With regard to compaction rolls, the first typed compactor machine generally includes a pair of rolls having a plurality of annular peripheral grooves and projections both extending in parallel and alternately in an axial direction. The grooves and projections of one roll are dislocated axially with respect to the grooves and projections of the other roll, respectively, such that the grooves of one roll and the projection of the other roll are disposed in registry with one another, and hence the projections of one roll and the grooves of the other roll are disposed in registry with one another. Thus the mating pair of groove and projection of the other roll jointly define a forming path therebetween at a position where the two rolls are confront each other.

When a mass of ganular material is compacted through the forming paths, the thus compacted material is highly detachable from walls of the groove and of the projection because of differences in peripheral rotational speed of the groove wall and the projection wall. As a result, the compaction rolls thus constructed may fail to exert compaction forces on the material since the material passes through the forming paths due to an insufficient retaining force acting on the same when the material has a relatively low viscosity. On the contrary, when a material of high viscosity is fed or an otherwise insufficient amount of the material is fed, a portion of the material moves along together with the walls of the grooves and/or the projections without being detached from the latter. The foregoing failures of the passing-through and the attaching impair a smooth operation of the machine and stable forming of the briquets.

In addition to those compaction rolls and the shearing means, a material feeder means is also important in achieving stable compaction forming. The prior compactor machine includes a feeder mechanism for guiding granular material therealong to feed the same into forming paths defined by and between the compaction rolls in which the material is preliminarily compressed to force out an air contained therein for thereby increasing a bulk density of the material.

One known feeder mechanism as shown in FIGS. 38 and 39 of the accompanying drawings includes a reversed frustoconical hopper 100 and a throat member 101 having a lower open end opening to an inlet space Z between the two rolls 200, and a tapered screw 103 for forcibly conveying the material toward the lower end . The lower open end of the throat member in the form of a circle, in which a lower end portion of the screw 103 is disposed and the lower end portion having a diameter A. The precompacted material M is fed into the inlet space Z defined between confronting peripheral portions of the rolls 200 extending between a first plane extending through axes of the rolls to pass a nip point N of the latter and a second planes extending respective axes of the rolls to a circular edges of the lowermost end portion of the tapered screw 103, and by a horizontal plane extending on the lower open end of the throat member 101. The second planes are slanted at an angle or nip angle $\beta$ with respect to the first plane about the respective axes of the rolls. A pair of triangular cheek plates 102 are provided at the lower end so as to seal opposite lateral openings of the inlet space in a pair of vertical parallel planes extending on opposite end surfaces of the rolls. As better shown in FIG. 36, the horizontal cross section of the hopper is a circle A, while the horizontal cross section of the inlet space is a rectangular shape. Consequently, when a mass of the material having been precompacted by cooperation of the tapered screw and the downwardly tapered screw and the downwardly tapered hopper is conveyed through a relatively narrow hopper throat of the circular cross section into a larger inlet space including a space X of the rectangular cross section, volumetric restriction given by the narrow throat is suddenly relieved, with the result that the precompacted material tends to bulge and thus recover its initial bulk density. More specifically, the material firstly confined within a space having the cross section of the circle A is released into the larger space having an increased volume X illustrated by hatched lines in FIG. 36.

Another prior compactor machine has a pair of compaction rolls having a relatively larger width W2 as schematically illustrated in FIG. 35, in which a pair of tapered screws are disposed in an adjacent parallel relation. Such tapered screws have lower end portions of a diameter O being about half the width W2. The two rolls are spaced apart from each other by a gap G at the nip point N.

SUMMARY OF THE INVENTION

According to one aspect of the invention, a compactor machine includes: a pair of compaction rolls having respective axes disposed in parallel to each other and being positively rotatable in symmetrical direction to compressively force a granular material through forming paths defined between the rolls, each of said compaction rolls having a plurality of annular peripheral grooves and projections alternately at uniform intervals in an axial direction thereof such that the grooves and projections of one roll are positioned to correspond to the projections and grooves of the other roll, each pair of the corresponding groove and projection jointly defining one of the forming paths therebetween; a feeder mechanism for compressively and continuously feeding the granular material to the compaction rolls; a pair of pinch rolls disposed downstream of the compaction rolls for crimping the compacted material conveyed from the forming paths; and a pair of toothed rolls each having a plurality of teeth at circumferentially uniform intervals on peripheries thereof, and being positively rotatable in synchronism for cutting the precompacted material into small pieces by forcing the teeth thereof into the precompacted material.

According to other aspect of the invention, a compactor machine includes a pair of compaction rolls and a pair of scraper units mounted on the compaction rolls, respectively, at outlet side thereof, the scraper unit including a movable scraper body having prongs slidably received in annular peripheral grooves on the roll and a drive means for moving the prongs slidably along the grooves toward and away from forming paths defined between the rolls so as to close and open the forming paths.

According to still another aspect of the invention, a compactor machine includes a pair of compaction rolls and a feeder mechanism comprising a hopper, a throat connected thereto and including a throat member of a downwardly tapered frustoconical shape and a throat outlet member connected to each other with respective inner walls disposed in registry with each other, and a tapered screw being disposed in the hopper and the throat, and having its lower end portion in registry with a lower end of the outlet member, wherein the outlet member includes a lowermost opening of a rectagle having two sides each equal to a width of the compaction rolls, an uppermost circular opening having a diameter larger than a diagonal of the rectangle, and an inner peripheral wall extending between the lowermost and uppermost openings to thereby merge with peripheral surfaces of the rolls.

It is therefore an object of the invention to provide a compactor machine of a simple construction for forming granular materials into small pieces such as briquets, which achieves a suitable and stable forming of briquets having compacted to a sufficient degree and devoid of rough surfaces.

Another object of the invention is to provide a compactor machine having at least one pair of compaction rolls for forming granular materials into firm briquets irrespective of viscosity of the materials.

Still another object of the invention is to provide a compactor machine having a notching means and a cutter means, in which granular material is firstly formed into intermediate elongate strips and the intermediate strips are cut into small pieces by the cutter means at a point where the notching means made a notch on the strip.

Still another object of the invention is to provide a compactor machine including a pair of compaction rolls having annular peripheral grooves and a movable scraper means being movable slidingly in the grooves at an outlet side thereof for closing and opening forming paths defined between the rolls so as to assure the compaction performed by the rolls and prevent the rolls from rotating with portions of the material attached thereto.

A still further object of the invention is to provide a compactor machine having at least one pair of compaction rolls and an improved feeder means in which granular material is preliminarily compacted and the thus precompacted material is fed to the rolls without impairing the precompacted condition thereof.

DETAILED DESCRIPTION OF THE PREFERRED EMBODIMENTS

Figure 1:
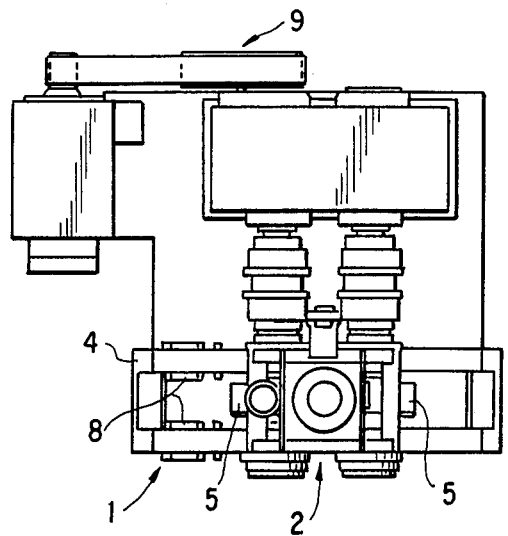
FIG. 1 is a diagram showing a general construction of a compactor machine.

Like reference numerals refer to like or corresponding parts throughout several views in the drawings.

Figure 2:
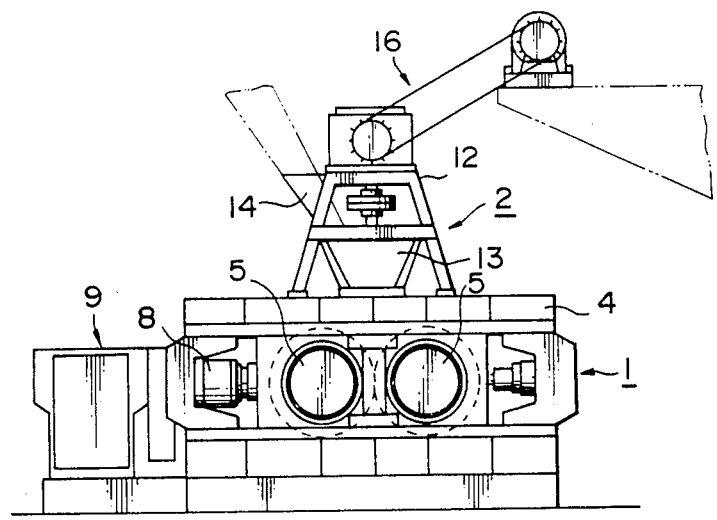
FIG. 2 is a front elevational view of a compactor machine according to a first embodiment of the invention.
Figure 3:
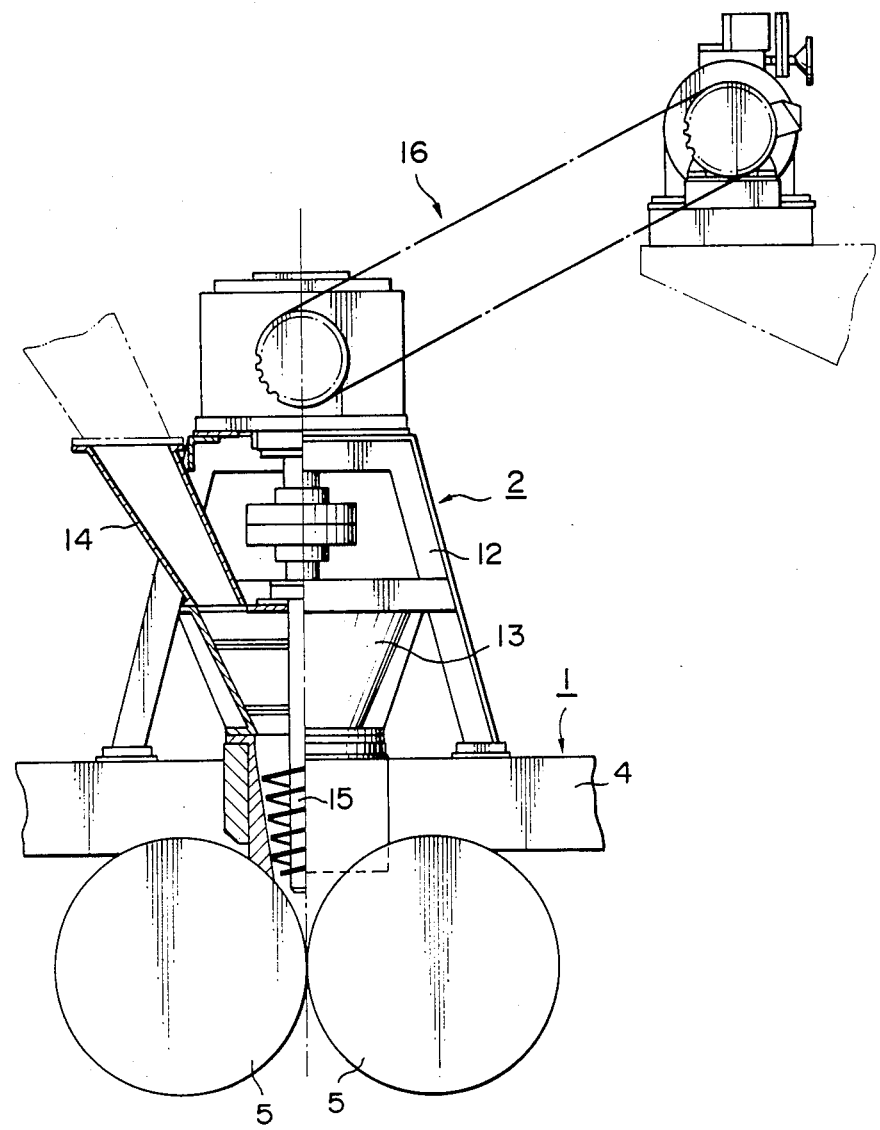
FIG. 3 is a fragmentary front view of FIG. 2, partly in cross section, shown in an enlarged scale.
Figure 4:
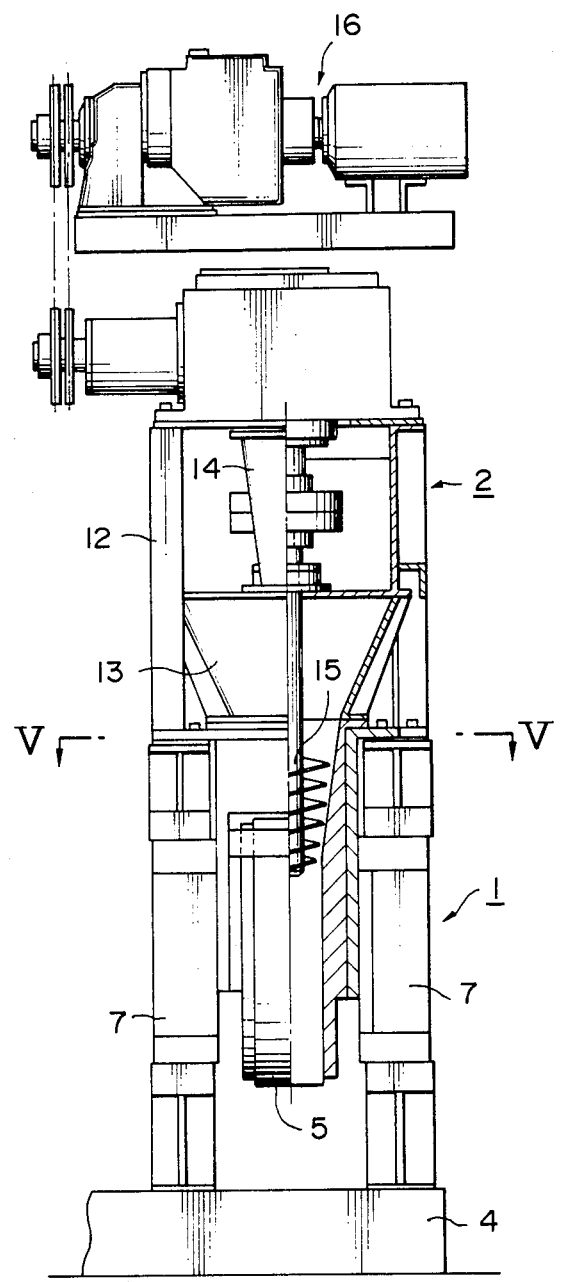
FIG. 4 is a fragmentary side elevational view of FIG. 2, partly in cross section, shown in an enlarged scale.
Figure 5:
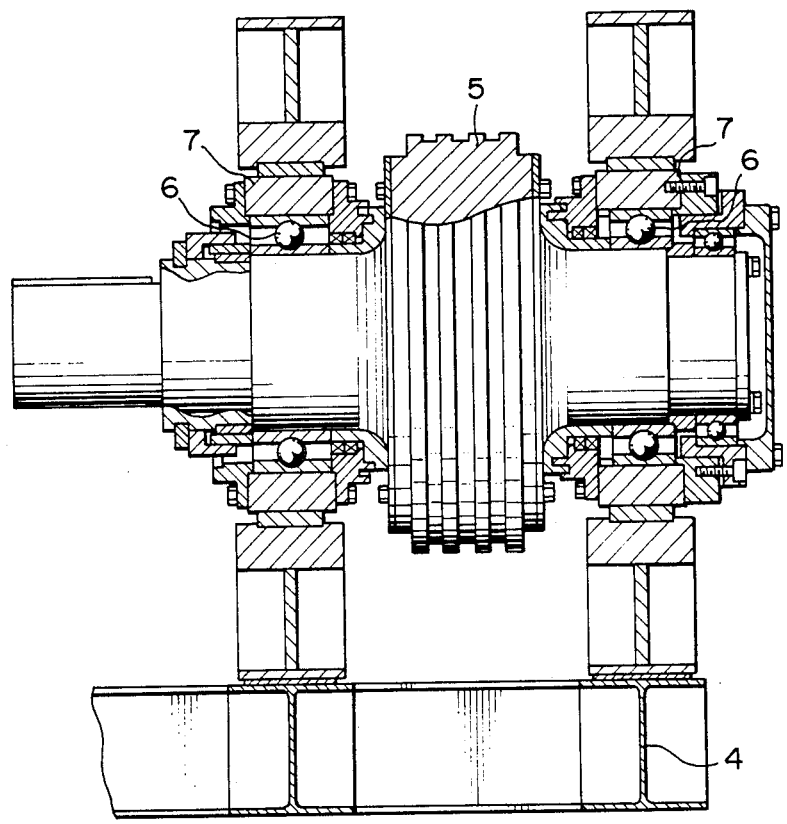
FIG. 5 is a vertical cross-sectional view taken along line V—V of FIG. 4, with some parts omitted.

As shown in FIG. 1, a compactor machine comprises a feeder mechanism, a compaction roll means, and a cutter roll means. FIGS. 3 and 4 show a compactor machine according to the present invention. The machine includes a compaction forming unit, generally designated at reference numeral 1, and a feeder unit 2 disposed upstream of the compaction forming unit 1. As shown in FIGS. 2 and 5, the compaction forming unit includes a support frame 4, a pair of cooperative compaction rolls 5, 5 rotatably supported on the support base 4 via bearing units 7, 7 disposed on the latter, a fluid cylinder 8 secured to the support base 4 for moving one compaction roll 5 toward and away from the other compaction roll 5, and a drive unit 9 for rotating the two compaction rolls 5,5.

The feeder unit 2 is actuated to compress or compact a granular material M preliminarily and then feed the same into an inlet space 20 defined between the two rolls. The feeder unit 2 includes a frame 12 disposed on the support base 4, a hopper mechanism 13 having a downwardly tapered throat communicating to the inlet space 20 for guiding the material M into the latter, and a screw 15 disposed within the hopper mechanism for exerting precompaction on the material M and forcing the same into the inlet space 20 of the roll 5,5, the screw 15 being operatively connected to a drive means 16.

Figure 7:
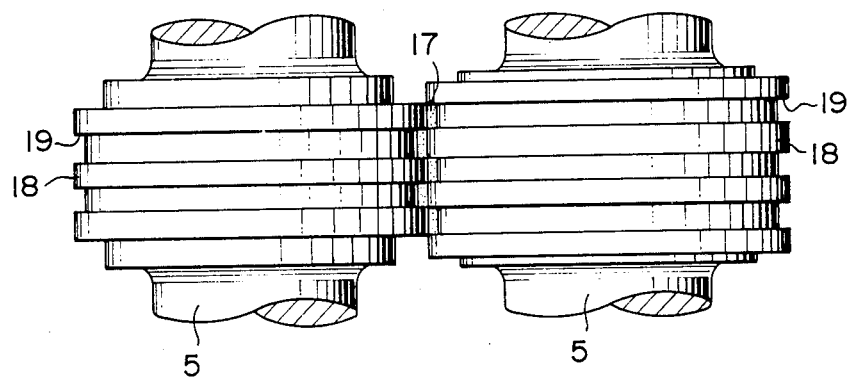
FIG. 7 is a plan view of a pair of compaction rolls incorporated in the briquet forming system of FIG. 6.

As better shown in FIG. 7, the two rolls are disposed in a close confronting relation to each other. Each of the compaction rolls 5,5 has a plurality of annular peripheral grooves 19 and a plurality of annular peripheral projections 18 which are arranged alternately in an axial direction on peripheries of the rolls 5. The annular grooves and projections 19,18 of one roll are arranged in registry with the annular projections and grooves 18,19 of the other roll as shown in FIG. 7, such that mating pairs of the grooves of one roll and the projections of the other roll are disposed in confrontation with each other to thereby define respective forming paths 17 of a rectangular cross section. The annular projection 18 of one roll has a width slightly smaller than that of the groove 19 of the other roll, and has a peripheral end surface disposed slightly out of the corresponding groove 19.

Figure 14:
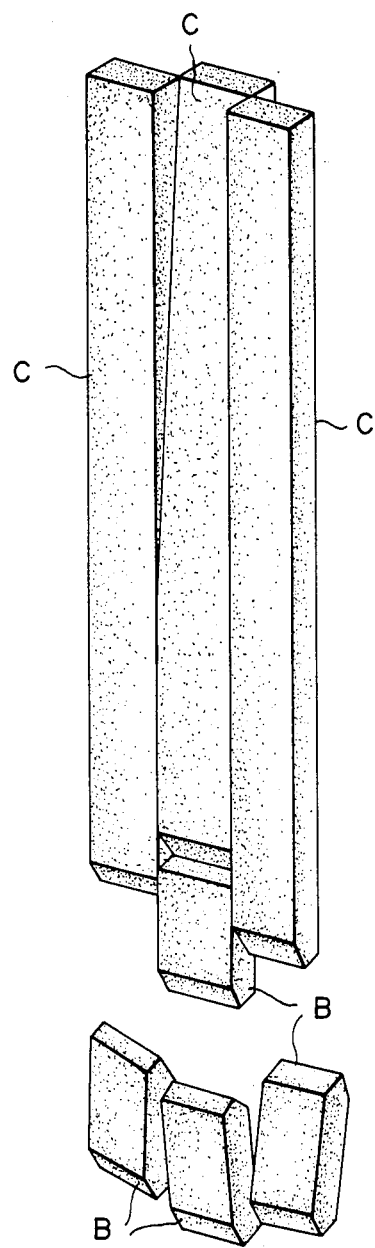
FIG. 14 is a perspective view of intermediate elongate materials and briquets formed therefrom by the compactor machine.
Figure 15:
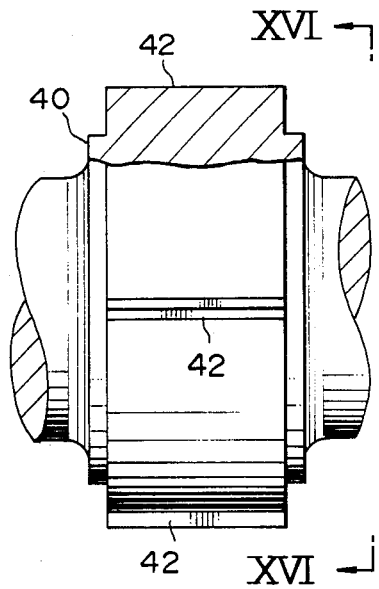
FIG. 15 is a side elevational view of a toothed cutter rolls, partly in cross section, incorporated in the briquet forming system of FIG. 13.
Figure 16:
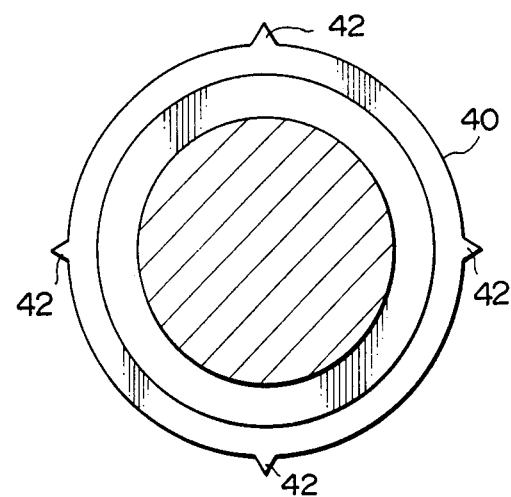
FIG. 16 is a front elevational view as viewed along line XVI—XVI of FIG. 15.

The compaction roll 5 is composed of an integral body. Alternatively, the compaction roll 5 may be composed of a cylindrical core body and a tubular peripheral body having annular grooves and annular projections, in which the cylindrical body may comprise a single integral body or a plurality of segmental portions. The two compaction rolls 5,5 are rotatable to compress the material in the forming paths to form intermediate elongate strips C. The strips are best shown in FIG. 14.

Figure 6:
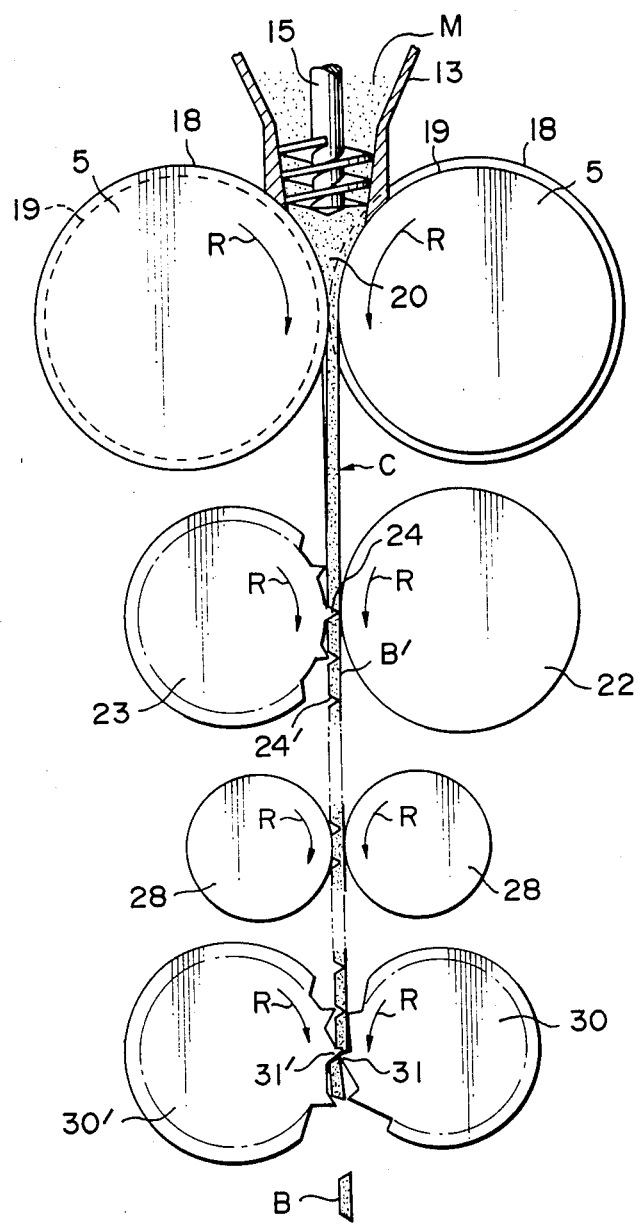
FIG. 6 is a schematical front view of a briquet forming system according to the first embodiment of the invention.

FIG. 6 shows a briquet forming system of the compactor machine 1, in which system a pair of cooperative sizing or notching rolls 22, 23, a pair of pinch rolls 28, 28 and a pair of toothed or cutter rolls 30, 30' are disposed downstream of the compaction rolls 5,5 in this order along a path line of the material M. Every pair of rolls are rotatable in a symmetrical direction R.

One notching roll 22 has a smooth peripheral surface, while the other notching roll 23 has teeth 24 arranged on its periphery in an axial direction thereof. The teeth have a triangular cross section in a plane perpendicular to an axis of the notching roll 23. The teeth 24 are disposed at circumferentially uniform intervals. The notching roll 23 is rotatable in cooperation with the other notching roll 22 such that the teeth 24 are forced to bite into the intermediate elongate strips C, thus marring notches 24' in the strips C. Portions of the strips defined between adjacent pair of notches 24' become briquets when they are separated in a downstream process.

The pinch rolls 28 serve to guide the intermediate elongate strips C of the compacted material coming from the compaction rolls. The pinch roll 28, 28 may be positively rotated by means of a drive mechanism (not shown), or otherwise may rotate only in an idling manner.

The cutter roll 30 have on peripheries thereof teeth 31 having a triangular cross section in a plane perpendicular to an axis of the roll 30. The cutter roll 31' has on periphery thereof guide recesses 31'. When the cutter rolls 30,30' receive the intermediate strips C therebetween, the two rolls 30,30' rotate cooperatively in synchronism so as to separate the strips into small pieces of briquets B.

In the briquet forming system described hereinabove the granular material M is continuously fed downwardly through the forming paths 17 where the material is continuously formed into the intermediate elongate strips C by a compaction force created by and between the compaction rolls 5,5. The thus formed intermadiate strips C subsequently pass through the pair of notching rolls 22,23 which create the notches 24', and thereafter the notched strips C move through the pair of pinch rolls 28,28 to the pair of cutter rolls 30,30' where the strip portions B' are cut off at notches 24' to form the briquets B.

If an adjacent pair of tne intermediate strips C are laterally interconnected with each other due to material portion entered a clearance between the corresponding pair of the groove 19 and the projection 18, the connected pair is smoothly separated by being compressed in a thickness direction by the downstream pair of rolls, namely notching rolls in this particular embodiment.

Alternately, the pair of compaction rolls 5,5 may be disposed more closely to each other in a slightly intermeshing relation so as to diminish the occurrence of such interconnection. With this arrangement intermeshing side wall portions of the pair of groove and projection prevents a mass of the material from entering between the side wall portions and thus also from interconnecting the adjacent intermediate strips C.

Figure 8:
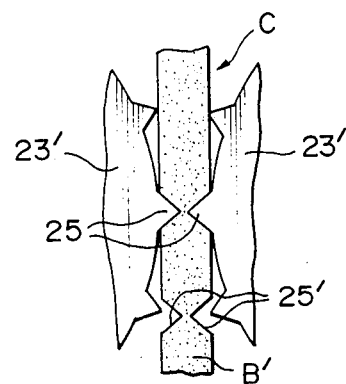
FIG. 8 is a fragmentary view of a pair of modified notching rolls for use in the briquet forming system of FIG. 6.

FIG. 8 shows a pair of modified notching rolls 23',23' each having on its periphery a plurality of notching teeth 25 which are similar to the teeth 24 of the notching roll 23 with the exception that the former teeth 25 have a height shorter than that of the latter teeth 24, in which intermediate strips C are notched at a common point from opposite sides.

Figure 9:
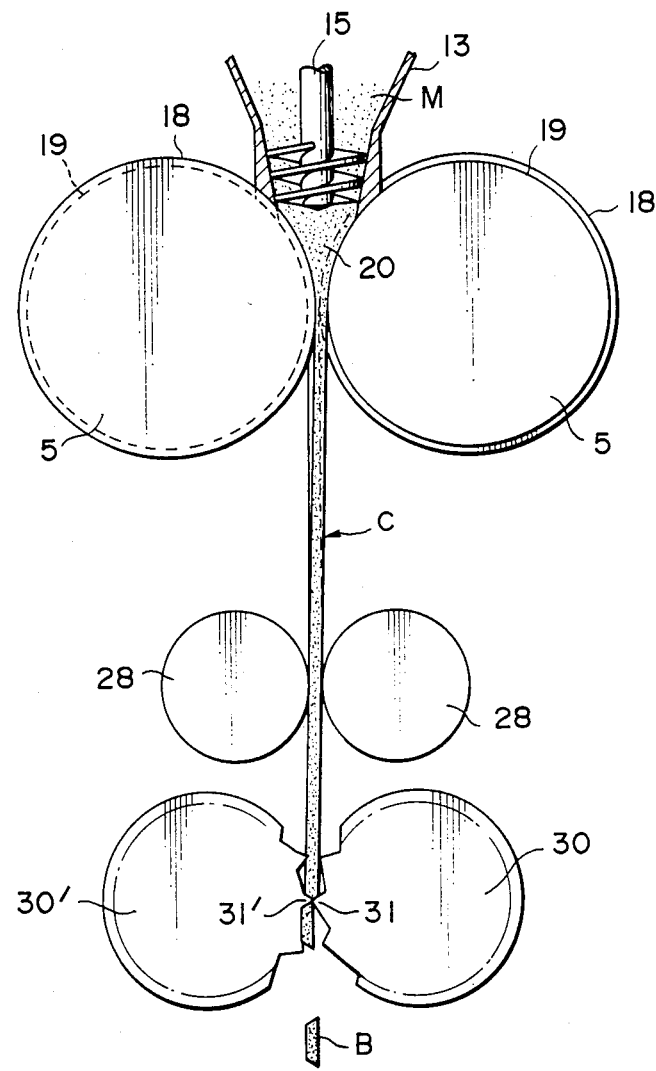
FIG. 9 is similar to FIG. 6, showing a modified briquet forming system.

FIG. 9 shows a modified forming system similar to the system of FIG. 6, with the exception that the pair of notching rolls 22, 23 are omitted and the intermediate strips C are directly cut into briquets B by the cutter roll 30, 30' which are driven at a torque higher than that of the cutter rolls of FIG. 6. In this particular forming system, the intermediate strips laterally interconnected to each other, if any, could be separated by a compression force caused between the pinch rolls 28,28.

Figure 10:
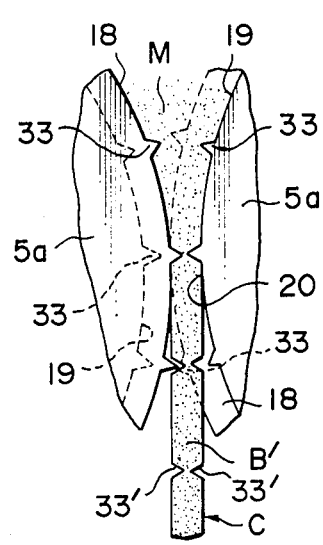
FIG. 10 is a fragmentary front elevational view of a first modified compaction rolls.

FIG. 10 shows first modified compaction rolls 5a, 5a including a plurality rows of notching teeth 33 disposed on the annular projections and the annular grooves 19 at a circumferentially uniform intervals. The teeth 33 have a rectangular cross section in a plane perpendicular to the axes of the roll 5a, 5a, and the teeth 33 in each row are arranged in registry with each other in an axial direction of the roll 5a. The two roll 5a, 5a are rotated in synchronism such that the mating pair of teeth rows meet with each other at a nip of the two rolls 5a, 5a. In operation the rolls 5a, 5a with notching teeth 33 impart notches 33' on the strips C simmultaneously at respective points common to the opposite sides thereof.

Figure 11:
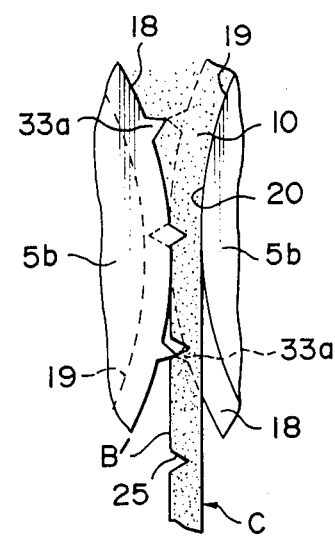
FIG. 11 is a fragmentary front elevational view of a second modified compaction rolls.

FIG. 11 shows a second modified compaction rolls 5b, 5b, in which only one of the roll 5b has notching teeth 33a in a similar manner to the toothed rolls 5a. The teeth 33a may have a height greater than that of the teeth 33.

Figure 12:
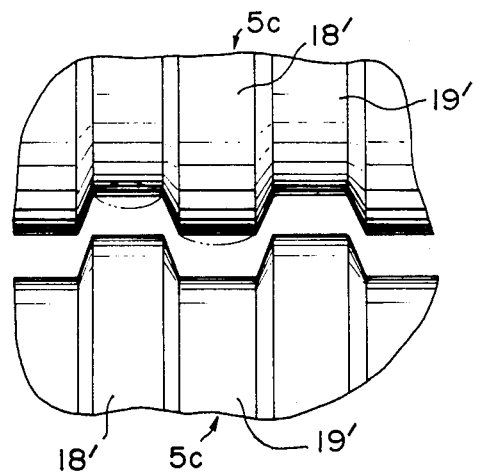
FIG. 12 is a fragmentary plan view of a third modified compaction rolls.

FIG. 12 shows third modified compaction rolls 5c, 5c including annular peripheral grooves 19' and projections 18', each pair of confronting groove and projection have a trapezoidal cross section in planes perpendicular to respective axes of the rolls 5c, 5c. The groove 19' and projection 18' may have convex bottom and outermost surfaces, respectively as shown by a phantom line in FIG. 12. Otherwise, the groove 19' and projection 18' may have concave bottom and outermost surfaces, respectively, also as shown in the same drawing.

As described hereinabove, according to the present invention, the compactor machine of a simple construction achieves a stable separation of the intermediate compacted material by means of a pair of cutter rolls.

Figure 13:
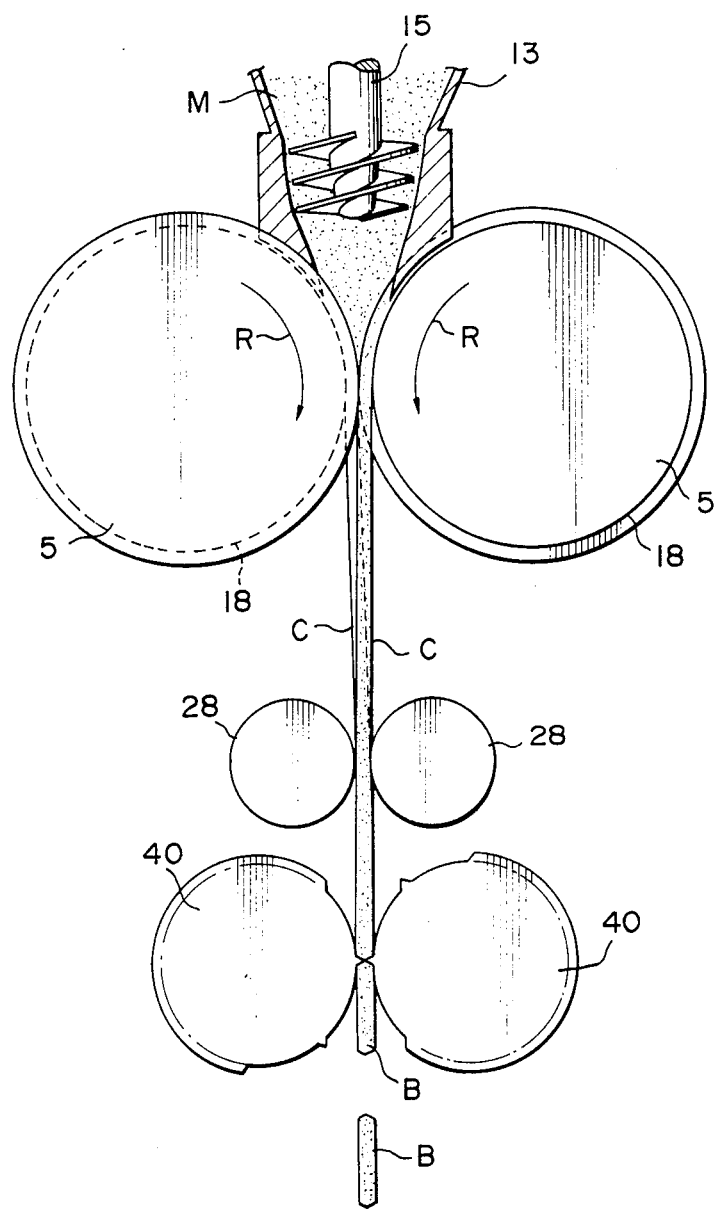
FIG. 13 is a schematical view of a further modified briquet forming system.

FIGS. 13-17 show a further modified briquet forming system. The forming system of FIG. 13 is similar to the system of FIG. 9 except for that the cutter roll 30,30' are replaced by a pair of toothed cutter rolls 40,40, each having a plurality of teeth 42 disposed on a periphery thereof at circumferentially uniform intervals. This system is generally used in a compactor machine for forming briquets of reduced iron.

The two cutter rolls 40,40 are driven by a drive means (not shown) to rotate in a symmetrical direction such that each pair of teeth 42,42 on respective roll 40,40 move to meet with each other at a meeting point or nip.

Figure 17:
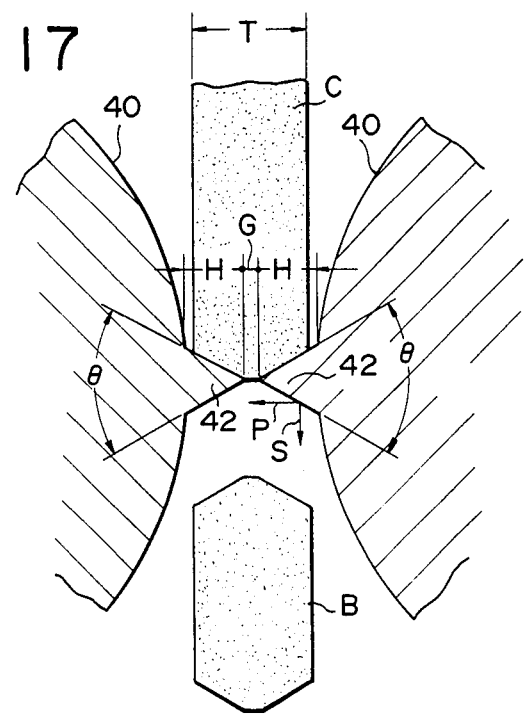
FIG. 17 is an enlarged fragmentary vertical cross-sectional view of the pair of cutter rolls.

The tooth 42 has a height H almost equal to or slightly smaller than a half of a thickness T of the intermediate strip C as shown in FIG. 17. A dimension of a gap G between the tips of the confronting teeth 42,42 is selectively determined within a range of (0 to $\frac{2}{3}$)×H by displacing the two rolls 40,40 toward or away from each other in a direction normal to the axes thereof.

Cutting operation of the two rolls 40,40 is described in detail hereinbelow.

The intermediate elongate strips C are guided through the pinch rolls 28 to a space between the two cutter rolls 40, 40, whereupon a pair of teeth 42,42 approach to the strip from both sides thereof upon the rotation of the rolls for thereby biting compressively into the strip C toward each other. At this time, a leading end portion of the strip C is cut off as a briquet B by a combination of a compressing force P and a separating force S created by each of the mating teeth 42,42. More specifically, the tooth 42 exerts the compressing force P on the strip C transversely thereof. This compressing force P is applied thereto transitionally gradually partly because the tooth 42 has the triangular of tapered configuration and partly because the tooth is moved gradually toward a center of the thickness of the strip C as the roll 40 rotates. Upon separation of the briquets from the strip, the strip is free from an objectionable deformation in a direction of the thickness of the same since the strip is seized compressively at oppsite lateral sides thereof by the pair of teeth 42, 42.

As a result the thus formed briquets B has a relatively smooth surface in comparison with the briquet formed through a breaking force or a shearing force by the conventional compactor machine. In addition, the cut surface thereof has an increased bulk density which is advantageous in case the briquet is composed of a reduced iron.

In this particular embodiment, the cutter rolls rotate at a peripheral velocity approximately equal to sum of a peripheral velocity of the compaction rolls 5 and a feeding velocity of the intermediate strip C. Alternatively, the peripheral velocity of the cutter rolls 40,40 may be adjusted to be slightly higher than that of the compaction roll 5,5. An included angle θ of the teeth 42 is preferably 30°-90°.

Figure 18:
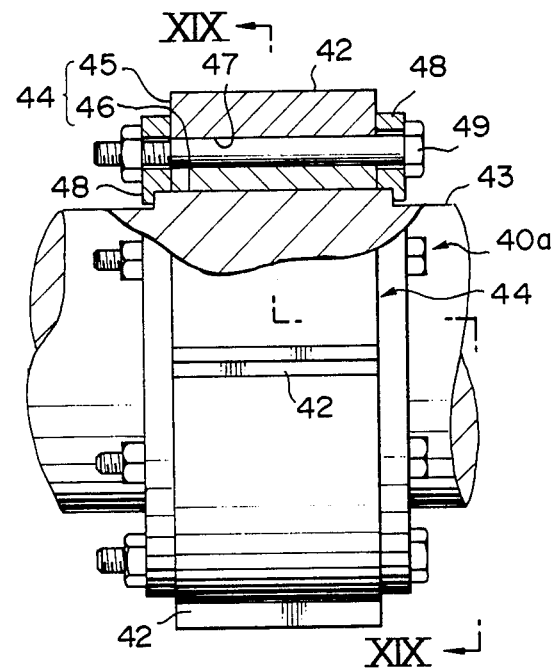
FIG. 18 is a side elevational view of a modified cutter rolls.
Figure 19:
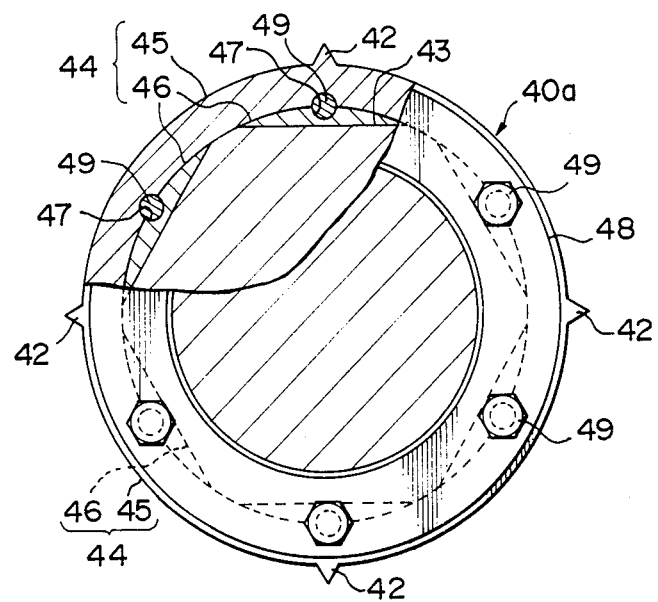
FIG. 19 is a front elevational view as viewed along line XIX—XIX of FIG. 18.

FIGS. 18 and 19 show one of cutter rolls 40a of a still further modified construction. The roll 40a generally comprised a roll body 43 of an equilateral polygonal shape having a plurality of flat surfaces on a periphery thereof, and a sleeve 44a detachably secured to the roll body 43 therearound, the sleeve having on a periphery thereof a plurality of teeth 42 disposed at circumferentially uniform intervals.

The sleeve 44 includes a sleeve member 45 and a plurality of attachments 46 disposed interiorly of the sleeve member. The attachments 46 have outer faces snugly attached to the inner wall of the sleeve member 45 and inner flat feces snugly attached to the flat surfaces of the roll body 43. The inner wall of the sleeve member 45 and the outer faces of the attachments 46 have mating transverse recesses of a semicircular cross section, respectively, such that the recesses are disposed in registry with each other to jointly define bolt holes 47. A pair of retainer rings or plates 48,48 having a plurality of holes are attached sidewardly over both the roll body 43 and the sleeve 44 at opposite sides. Bolts 49 are inserted through the bolt holes 47 via the holes of the retainer plates 48, whereby the bolts are fastened with respective nuts so as to secure fixedly the sleeve 44 to the roll body 43.

In case the teeth 42 are impaired by any damage or wearing, the thus toothed sleeve 43 can be easily removed by loosening the bolts 49 for replacement.

Figure 20:
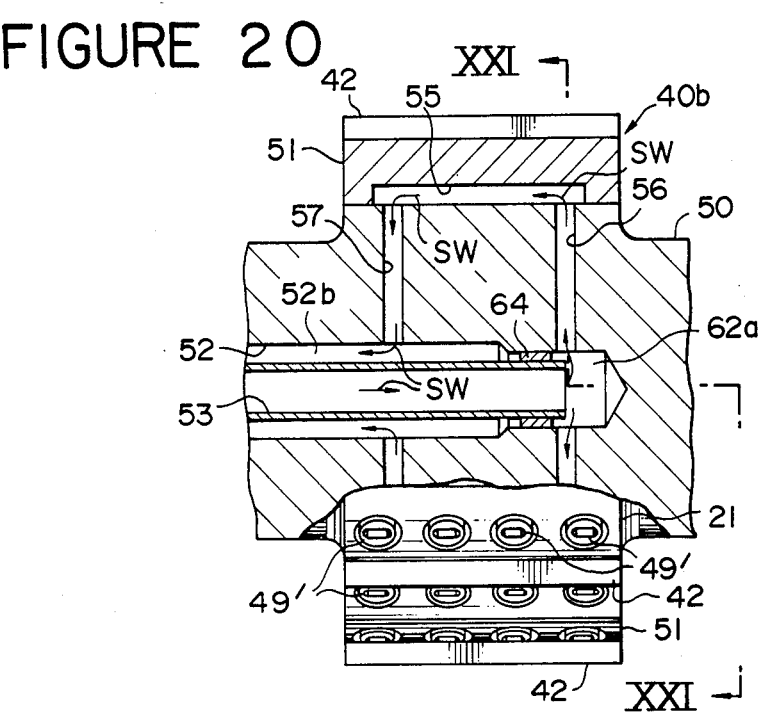
FIG. 20 is a side elevational view of a further modified cutter rolls.
Figure 21:
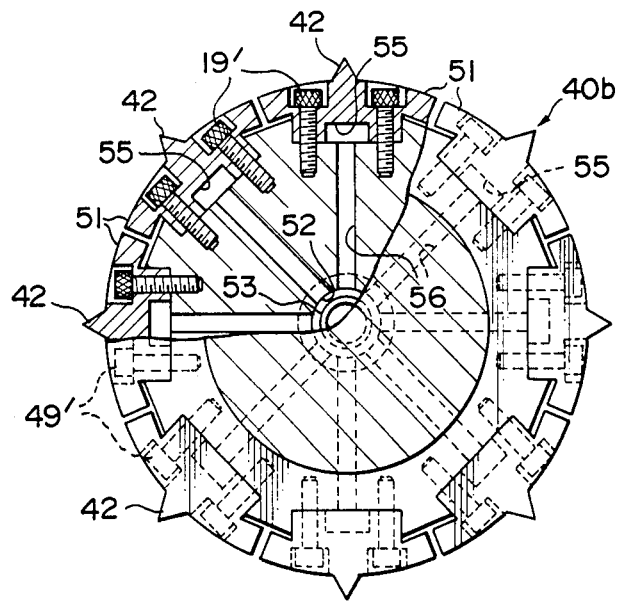
FIG. 21 is a front elevational view as viewed along line XXI—XXI of FIG. 20.

FIGS. 20 and 21 show one of cutter rolls 40b according to the invention. The cutter roll 40b comprises a roll body 50 and a plurality of peripheral member or segment 51 disposed on a periphery of the roll body at circumferentially uniform intervals, each segment 51 having on its outer periphery a tooth 42. The segment 51 are fastened to the roll body 50 by means of bolts 49' threaded into the latter through the segment 51 in a radial direction of the roll body 50. The thus constructed peripheral member 51 is easily detachable in a manner similar to the removing of the sleeve 45.

The cutter rolls 40b also includes a cooling system comprising an axial channel 52 for passing a coolant medium such as water therethrough, and a passage system communicating with the channel 52. The axial channel 52 extends axially centrally and substantially throughout the roll body 50 from one lateral side of the latter and has a closed end 52a in the other side thereof. A pipe 53 extends coaxially through the channel 52, and has one end connected to a coolant feeder means (not shown) and the other end disposed closely to the closed end 52a. A seal member 54 is disposed circumferentially of the pipe 53 adjacent to the other end thereof so as to sealingly close between the pipe and the channel. Consequently, the inner wall of the axial channel, the outer wall of the pipe 53 and the seal member 54 jointly define a space 52b for allowing coolant to return to the feeder means therethrough. The segments 51 have recesses 55 at inner sides confronting with the roll body 50, while the roll body 50 has a plurality of paired first and second channels 56, 57. The first channels 56 extend from the closed end portion 52a to the recesses 55, from which the second channels 57 extend to the space 52b.

Accordingly, each pair of first and second radial channels 56, 57 intercommunicate each recces 55 of the segment and the radial channel 52. As a result, the coolant medium flows from the feeder through the pipe 53, the first channel 56, the recess 55, second channel 57, and the space 52b as indicated by arrow SW in FIG. 20. With this arrangement, the cutter rolls 40b are effectively cooled to prevent a heat, which will otherwise be generated, from damaging the rolls.

Figure 22:
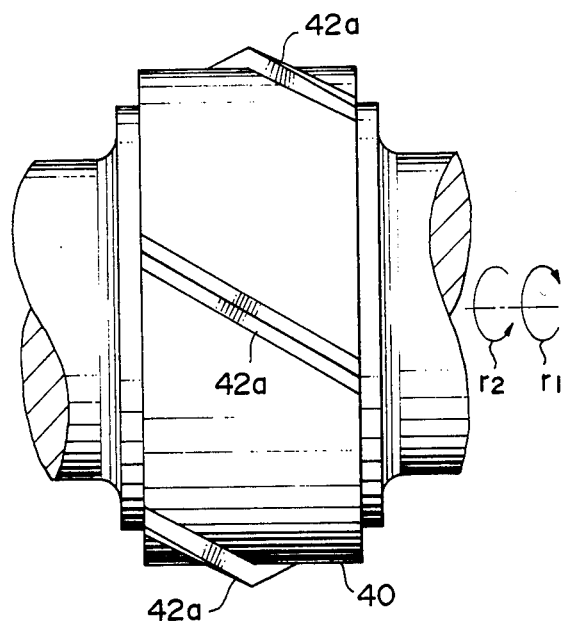
FIGS. 22-24 are side elevational views of still further modified cutter rolls.
Figure 23:
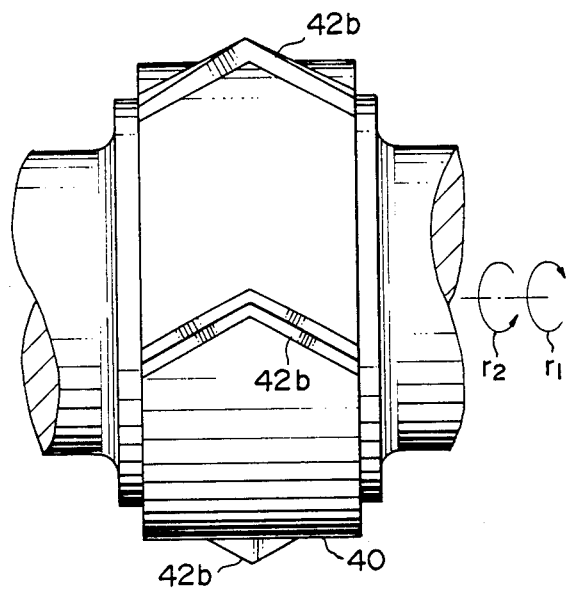
Figure 24:
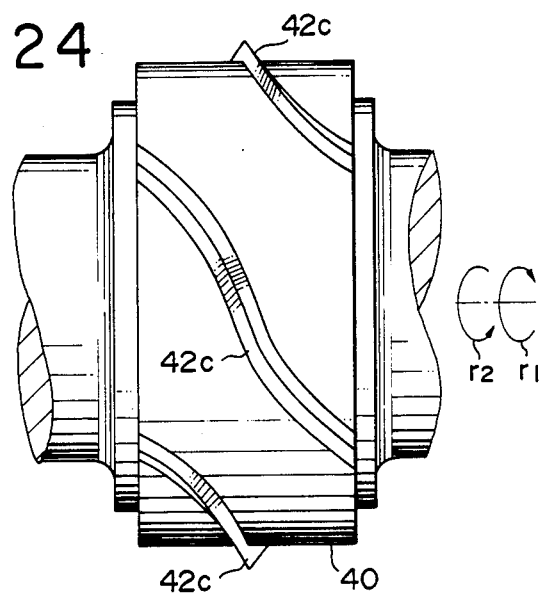

FIGS. 22, 23 and 24 show variously modified teeth of the cutter roll 40.

In FIG. 22, the roll has teeth 42a extending in a spiral manner on the peripheries thereof.

In FIG. 23, the roll 40 has on the periphery V-shaped teeth 42b which are adapted to prevent the intermediate strips C from being displaced in the axial direction during the operation.

In FIG. 24, the roll 40 has undulatory or wave-shaped teeth 42c. An adjacent pair of a trailing end of a preceding tooth and a leading end of a succeeding tooth are disposed in a line extending in parallel to the axis of the roll 40, thus resulting in the fact that a compressive cutting force is continuously applied to the intermediate strips C with no intermission by the teeth 42c during the operation of the rolls 40. Therefore an undulatory change of a strength of the compression force applied to the strips, which would cause an objectionable impact force impairing the strips, can be levelled off.

The toothed cutter rolls 40 of FIGS. 22, 23 and 24 may be driven to rotate in either direction as indicated by numerals r1, r2.

Figure 25:
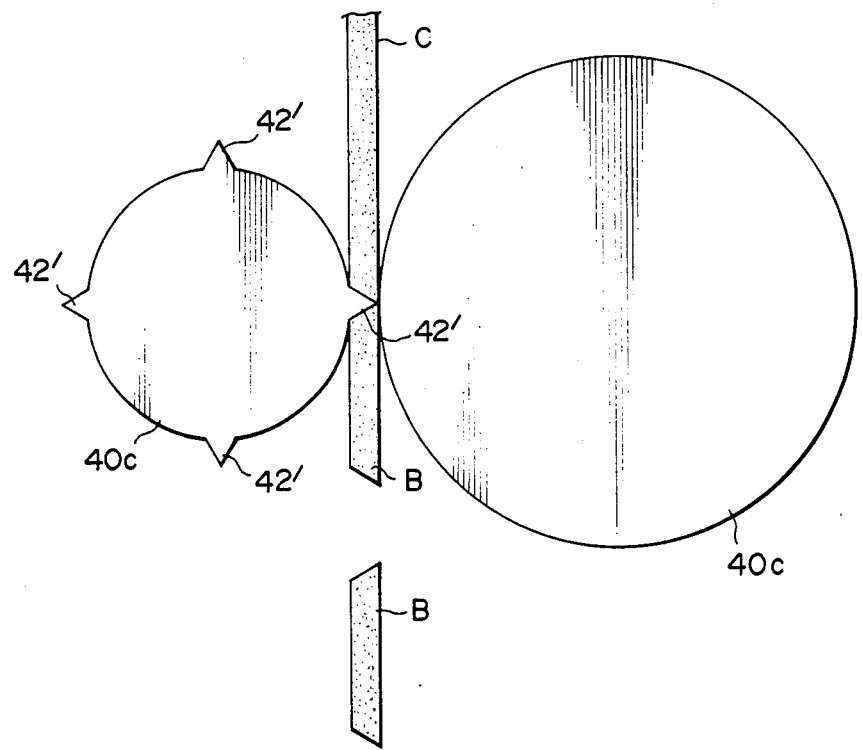
FIG. 25 is a schematical view of a pair of another modified cutter rolls.

FIG. 25 shows a pair of further modified cutter rolls 40c, 40c' including teeth 42' having a height substantially equal to the thickness T of the intermediate strip C, and the other roll 40c' has a smooth peripheral surface.

Figure 26:
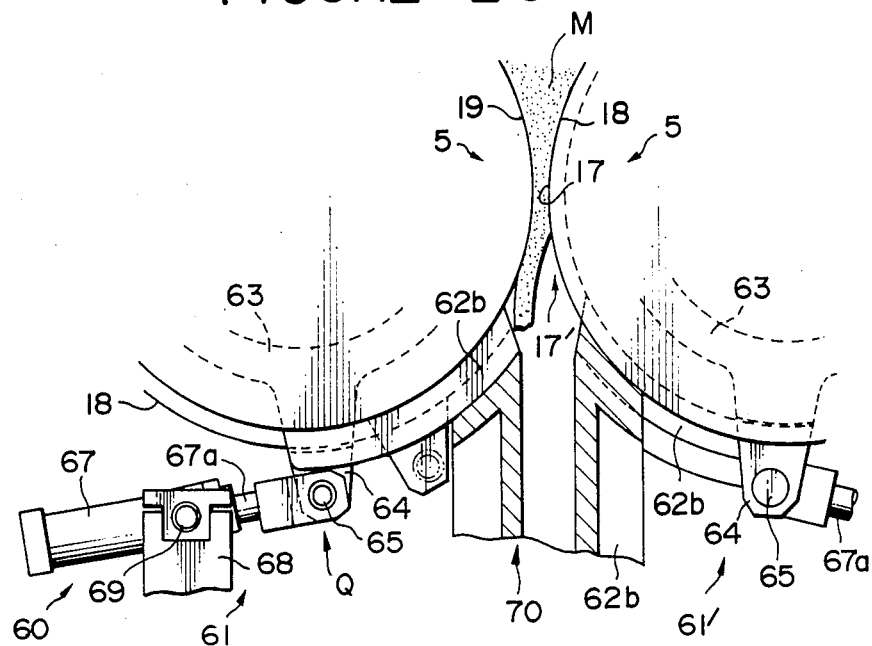
FIG. 26 is a schematical front view of a scraper mechanism according to a second embodiment of the invention.

FIG. 26 shows a scraper mechanism 60 according to a second embodiment of the invention, in which the scraper mechanism is mounted on the pair of compaction rolls 5,5 described hereinabove. The scraper mechanism includes a pair of scraper units 61,61' which are similar to each other in construction and are adapted to work for the corresponding compaction rolls 5,5, respectively. Thus only one scraper unit is described hereinbelow.

Figure 27:
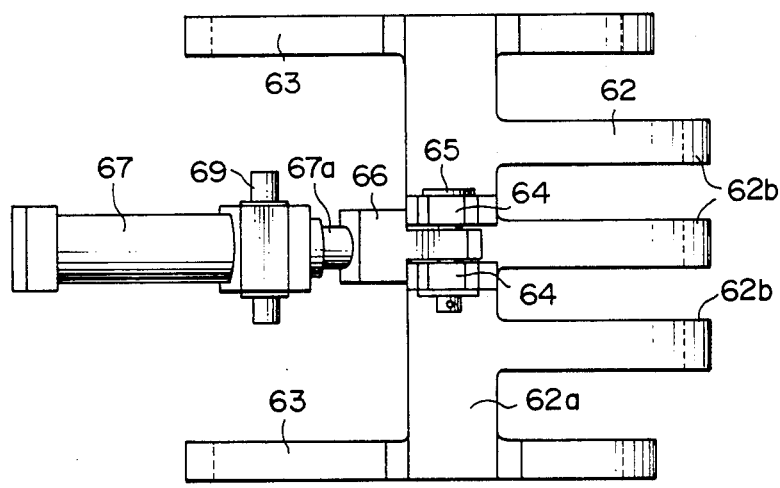
FIG. 27 is a bottom view of the scraper mechanism with some parts omitted, as viewed in a direction Q.

The scraper unit 61 is disposed downstream of the roll 5. As shown in FIG. 27, the unit 61 includes a fork-shaped scraper body 62 having a transverse member 62a, and a number of prongs 62b extending laterally therefrom, a pair of boss rings 63 connected integrally to the transverse member 62a at opposite ends thereof, and a fluid cylinder 67 operatively connected to the scraper body 62. The boss rings are adapted to be mounted loosely around the shaft of the roll 5 for thereby supporting the scraper body 62 such that the respective prongs 62b are movably disposed in the corresponding annular grooves 19 of the roll 5. The scraper body 62 has a bifurcated lug 64 disposed centrally thereof, to which a piston rod 67a of the fluid cylinder is connected via a link 66 and a pin 65. More specifically, the pin 65 is inserted through the lug 64 and the link 66 disposed therebetween so as to permit the link to pivot about the pin 65. The fluid cylinder 67 is pivotally supported on a bracket 68 via a pivotal trunnion 69 received on the latter. A guide 70 is disposed downstream of the forming path 17 and has an upstream end opening to an outlet 71' of the path 17. In FIG. 26, the scraper body 62 is in a retracted position in which forward ends of the prongs 62a are in registry with the upstream open end of the guide 70.

Upon actuation of the fluid cylinder 67, the piston rod 67a extends in a right hand direction in FIG. 26 to move the scraper body along and circumferentially of the roll 5, with the result that the prongs 62a slides in and along the grooves 19 toward the outlet 17' of the forming path 17. When the fluid cylinder becomes inactive, the prongs 62a are moved away from the outlet 17' as the piston rod of the cylinder is retracted.

In this particular embodiment, the scraper body 62 is moved by the fluid cylinder 67. Alternatively, the scraper body 62 is moved by an endless belt driven by a drive source and operatively connected to the boss ring 63.

The scraper body 62 may be moved linearly toward and away from the outlet 17' of the forming path 17 instead of being moved arcuately or circumferentially along the roll periphery.

With this arrangement, the forming path 17 can be temporally closed at its outlet by the scraper units 61,61, when the scraper bodies are positioned in a forwarded position (not shown). The thus closed forming path 17 can prevent the granular material from passing therethrough without being subjected to the compaction force. The prongs 62a of the scraper body 62 also serve to remove or peel off a portion of the material having adhered to the groove 19 and moving together with the roll 5, when the scraper body 63 is in the retracted position.

Figure 28:
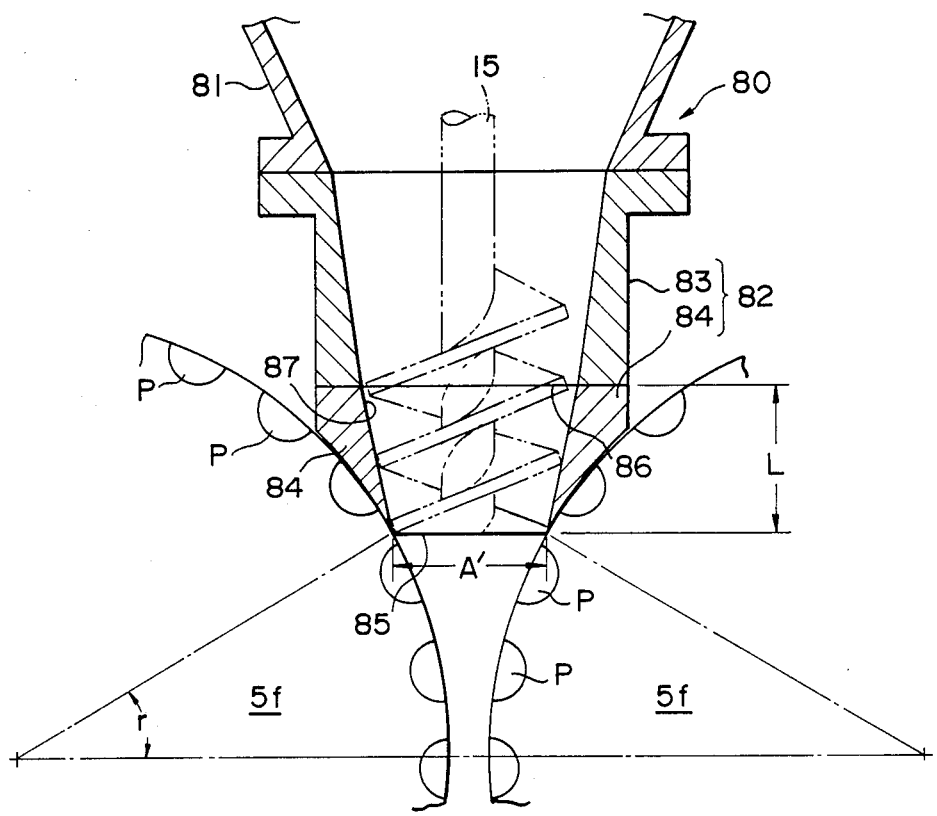
FIG. 28 is a schematical vertical cross-sectional view of a throat of a feeder mechanism according to a third embodiment of the invention.
Figure 29:
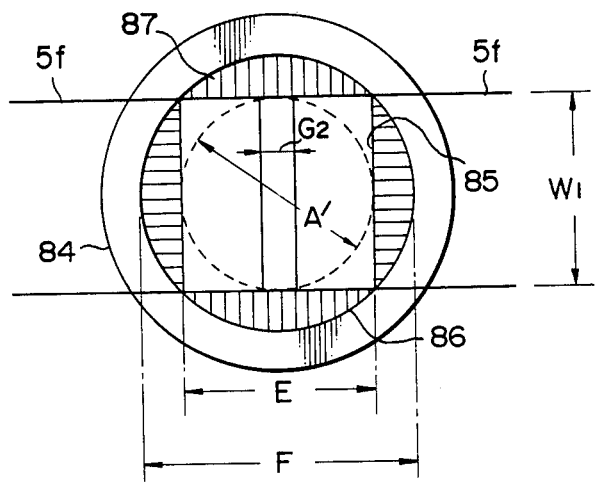
FIG. 29 is a schematical plan view of the throat.

FIGS. 28 and 29 show a part of a feeder mechanism according to a third embodiment of the present invention. The feeder mechanism 80 includes a funnel shaped hopper 81, a throat 82 connected at its upper end to the hopper and the tapered screw 15 disposed therein. The throat 82 includes a throat liner or throat member 83 of a downwardly tapered frustoconical shape and a throat outlet member 84 connected thereto in registry with each other. The throat member 83 has a downstream end having an inside diameter equal to that of an upstream end of the throat outlet member 84. As better shown in FIG. 29, the outlet member 84 includes a downstream end having an opening 85 of a square, and the upstream end having a circular opening 86. The square opening is defined by a square having a side of a length equal to an effective width W1 of compaction roll 5f. Thus in this embodiment, the width E of the opening 85 is equal to the width W1 of the roll 5f. The downstream end of the outlet member is disposed very close to and substantially merges with the peripheral surfaces of the compaction rolls 5f throughout the width W1 of the rolls. The square opening 85 is disposed such that opposite parallel sides extend in parallel to the axes of the two rolls 5f as shown in FIG. 29. The circular opening 86 has a diameter F larger than a diagonal of the square of the opening 85. The throat outlet member 84 also includes a downwardly tapered inner surface 87 extending between the upstream circular opening 86 and the downstream square opening 85. The inner peripheral surface 87 of the outlet member of the throat 83 is continuously narrowed or slanted inwardly as it extends downwardly, thus omitting the bulged space X which objectionably allows the precompacted material to expand. The tapered screw 15 is disposed within the hopper and the throat as shown by a broken line, and has a lowermost end portion of a diameter A' which is substantially equal to the width E of the lower opening 85.

Figure 30:
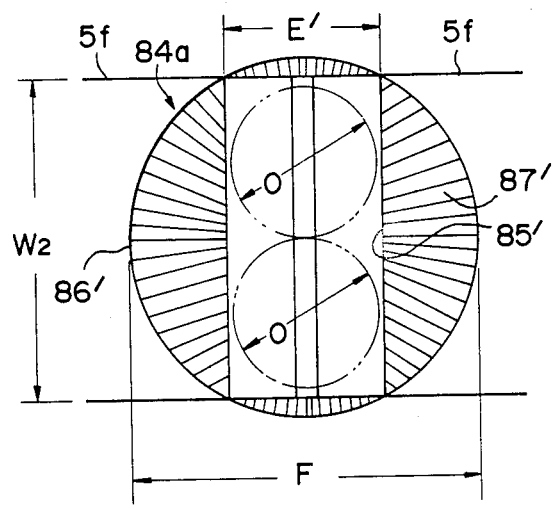
FIG. 30 is a schematical plan view of a modified throat appearing with parts of the prior compactor machine.

FIG. 30 shows a modified throat outlet member 84a. This outlet member 84a includes a lower opening 85' of a rectangle having a length equal to a relatively large width W2 of the roll 5f, and an upper opening 86' of a circle having a diameter F' larger than a diagonal of the rectangular opening 85'. An inner peripheral surface 87' extends between the two openings 85', 86' in a similar manner to the inner peripheral surface 87 of the outlet member 84. A pair of precompaction screws which have a diameter O equal to a half of the width W2 of the rolls as indicated by a phantom line in FIG. 30 are incorporated in the prior compactor machine and can be repalaced by a single screw of a diameter A when the present outlet member 84a is installed.

In this embodiment, the compaction rolls have a plurality of pockets P formed on the peripheries thereof instead of the annular grooves, the pockets being disposed at circumferentially uniform intervals. The two rolls 5f are spaced apart from each other by a gap G2 (in FIG. 29).

In operation, the two rolls 5f,5f rotate symmetrically to form briquets directly. At this time the screw 15 also rotates to exert precompaction on the material M in cooperation with the throat 82.

Figure 31:
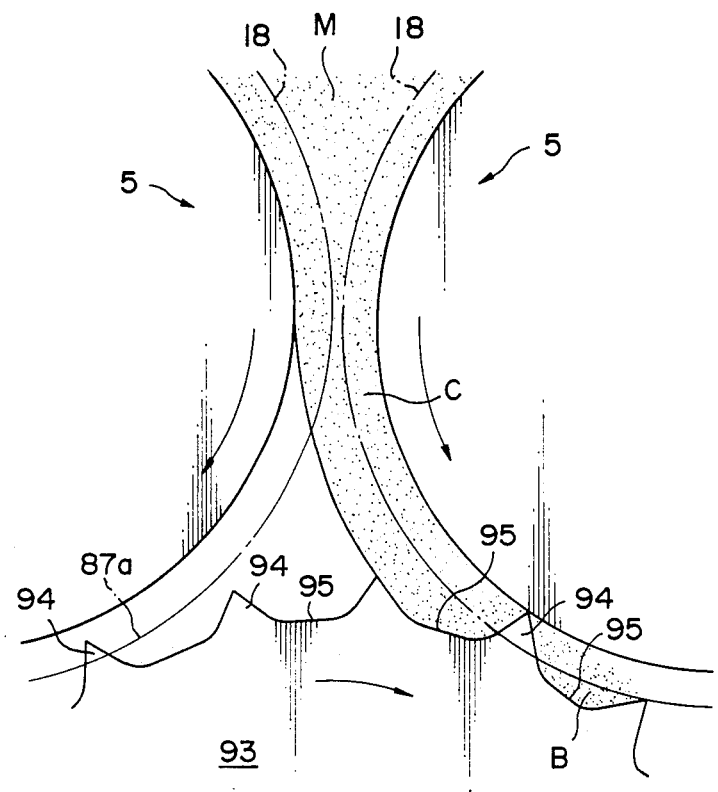
FIG. 31 is a schematical view of a further modified compaction rolls and a cutter rolls.
Figure 32:
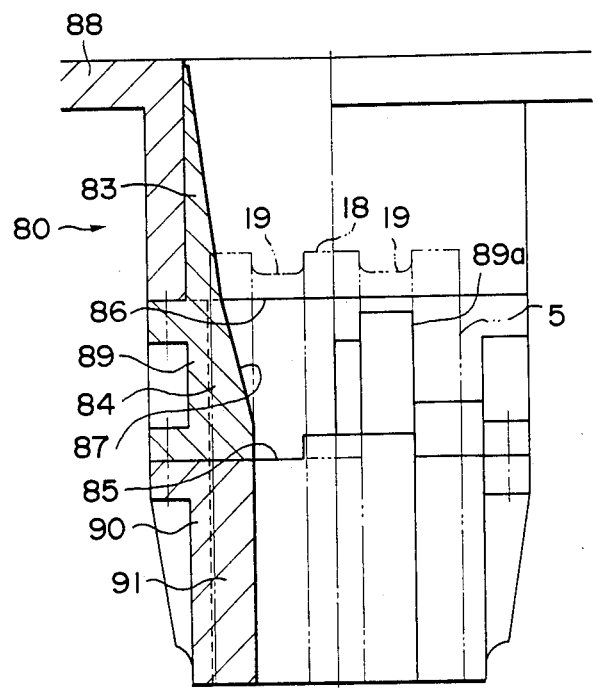
FIG. 32 is a schematical front view of a further modified throat, partly shown in cross section.
Figure 33:
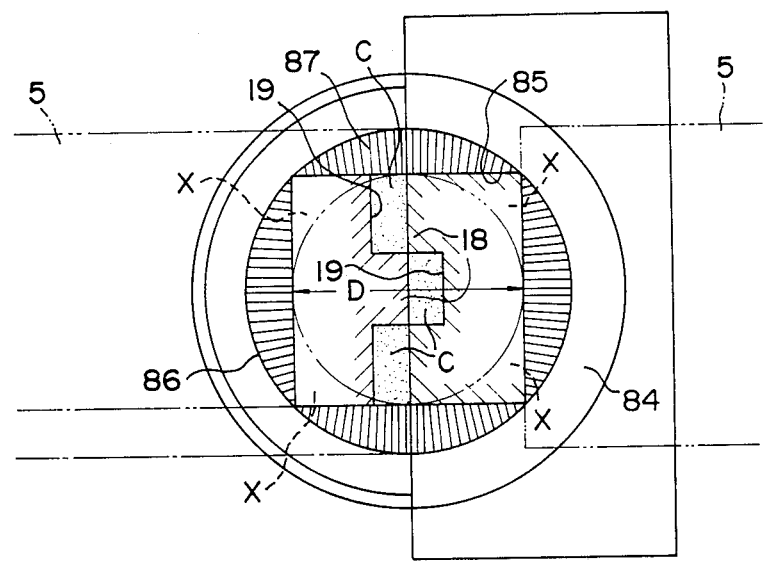
FIG. 33 is a schematical plan view of the throat of FIG. 32.
Figure 34:
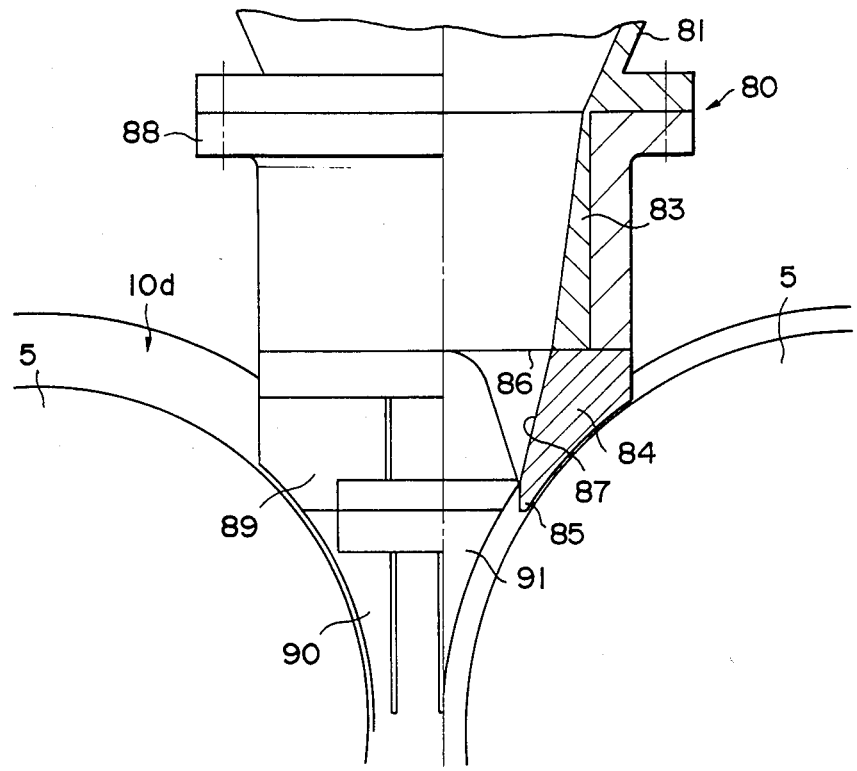
FIG. 34 is a schematical side elevational view of the throat, partly shown in cross section.
Figure 35:
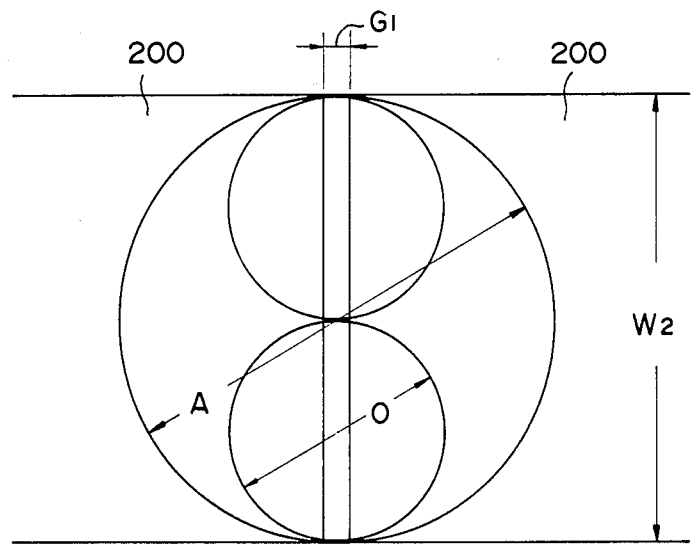
FIGS. 35-39 are schematical views or explanatory views of a conventional feeder mechanism.
Figure 36:
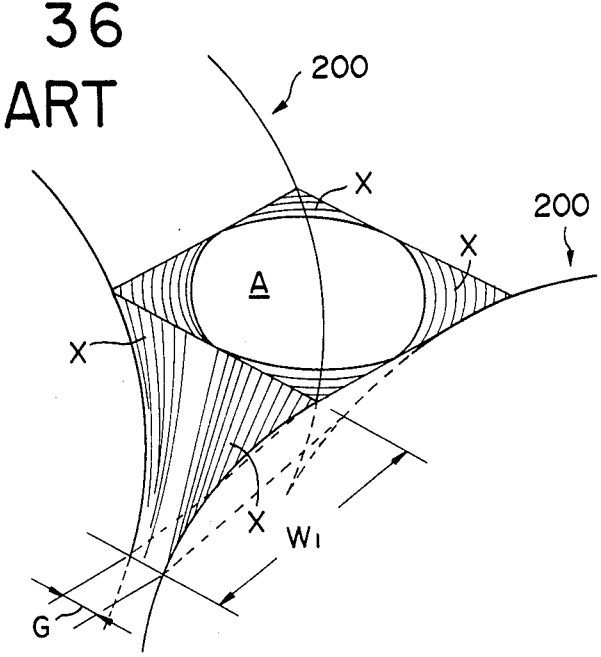
Figure 37:
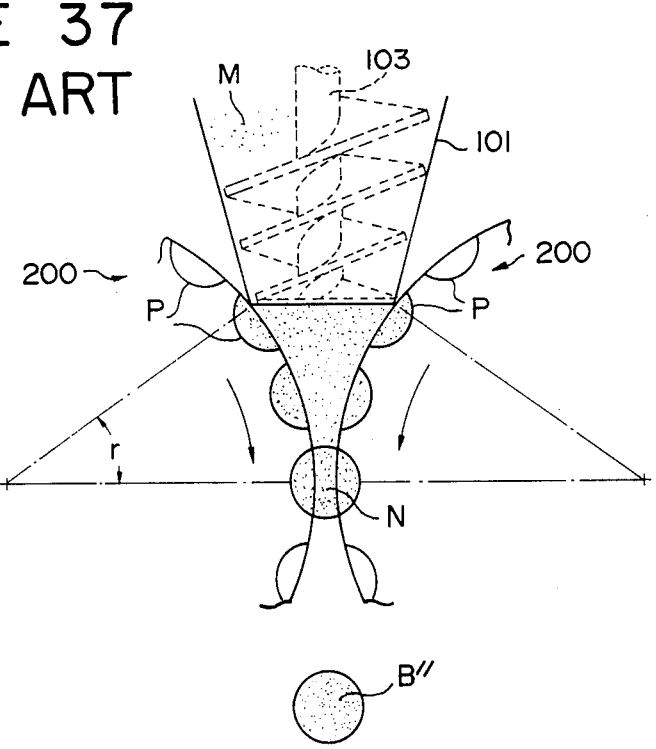
Figure 38:
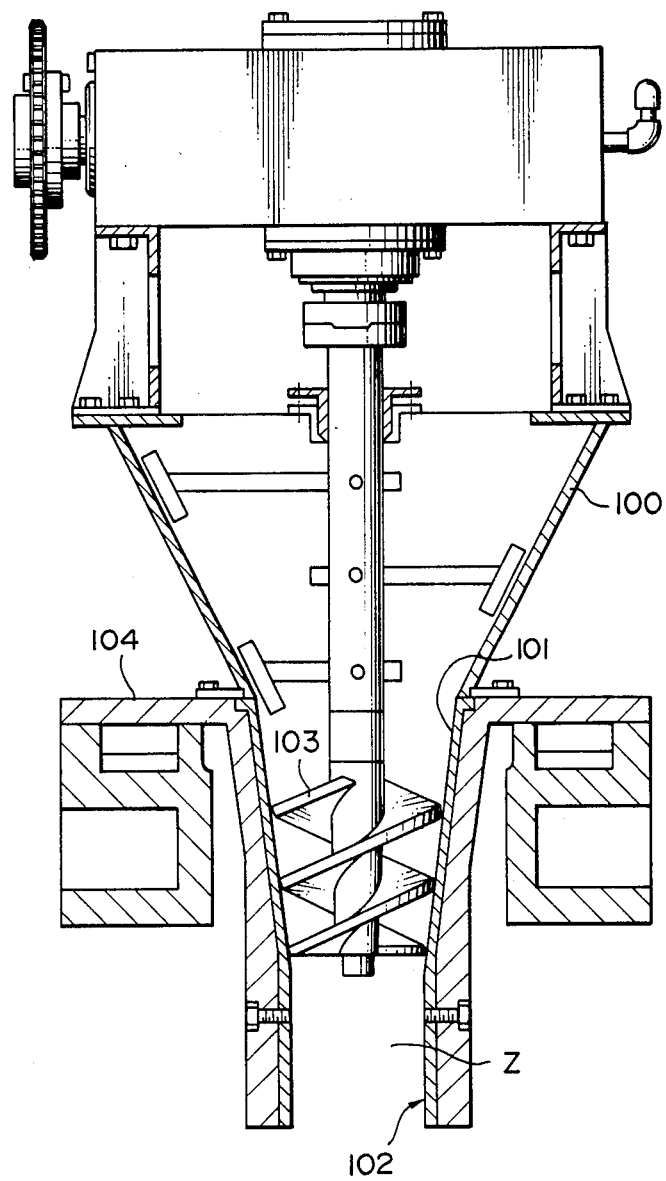
Figure 39:
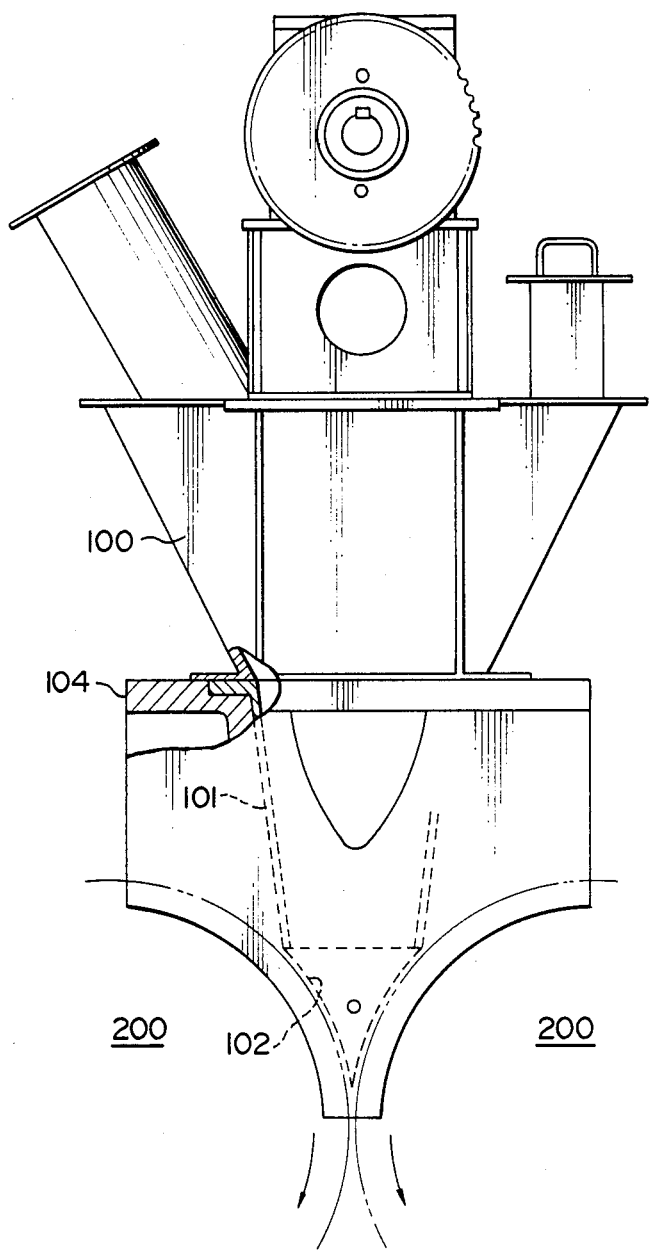

FIGS. 31–34 show the feeder mechanism 80 used for a further modified compaction machine of a triple roll type in which a pair of grooved compaction rolls 5,5 and a single cutter roll 93 are disposed in confronting relation to one another. As shown in FIG. 31 the cutter roll 93 has a plurality of teeth 94 and pockets 95 disposed therebetween on its periphery. The granular material M, having passed through the forming path between the two compaction rolls 5,5, is formed into intermediate strips C and then cut into the briquets B by the teeth 94, whereupon the briquets are subject to a secondary compaction between the cutter roll 93 and one of the compaction rolls 93. The throat member 83 and the throat outlet member 84 are mounted on the machine as shown in FIGS. 32 and 33.

In FIG. 32, the throat member is disposed interiorly of a feeder base 88. The outlet member 84 is connected to the throat member 83 downstreamly thereof. A side casing 89 is attached to the feeder base 88 for receiving the throat member 84. The side casing 89 has a pair of recessed portions at opposite sides thereof for accommodating the outlet member 84 therein. A pair of side plates 90 are connected to the side casing 89, and each supports a corresponding cheek plates 91 at an inner wall thereof.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A machine for continuously compacting granular material, comprising:
   (a) a pair of compaction rolls having respective axes disposed in parallel to each other, each of said rolls having a plurality of annular peripheral grooves and projections formed alternately at transversely uniform intervals in an axial direction thereof such that said grooves and projections of one roll are positioned so as to correspond to said projections and grooves of the other roll and such that mating pairs of said grooves of said one roll and said projections of said other roll are disposed in confrontation with each other, each pair of the corresponding groove and projection jointly defining a forming path therebetween, each said compaction roll being positively rotatable in a symmetrical direction to compressively force the material through the forming paths for thereby forming intermediate elongate strips of the material;
   (b) a feeder mechanism for continuously feeding the granular material compressively to said forming paths;

(c) a pair of pinch rolls disposed downstream of said compaction rolls for crimping the intermediate strips; and (d) a pair of toothed rolls each having a plurality of teeth formed thereon at circumferentially uniform intervals on a periphery thereof, and being positively rotatably symmetrically for thereby cutting the intermediate strips into small pieces by forcing said teeth into the strips.

2. A machine according to claim 1, wherein said compaction rolls are in an intermeshing relation to each other such that said grooves of each roll slightly receives the corresponding portions of the other roll.

3. A machine according to claim 1, further comprising a pair of notching rolls disposed between said compaction rolls and said pinch rolls for making notches on the intermediate strips, said cutter rolls being rotatable so as to insert said teeth into said notches.

4. A machine according to claim 1, wherein at least one of said compaction rolls includes teeth formed on said grooves at circumferentially uniform intervals.

5. A machine according to claim 4, wherein said at least one of said rolls further includes teeth disposed on said projections at circumferentially uniform intervals.

6. A machine according to claim 1, wherein said teeth of said cutter roll have a rectangular cross section in a plane perpendicular to the axes of the cutter rolls.

7. A machine according to claim 1, further comprising a scraper mechanism comprising a pair of scraper units mounted on the compaction rolls, respectively, at an outlet side thereof, said scraper units each including a movable scraper body having prongs slidably received in said grooves of the compaction roll and drive means for moving the prongs slidably along the grooves toward and away from said forming paths so as to close and open the latter.

8. A machine according to claim 1, wherein said feeder mechanism comprises a hopper; a throat connected thereto including a downwardly tapered frusto-conical throat member and a throat outlet member connected to each other with respective inner walls disposed in registry with each other, said outlet member including a lowermost opening of a rectangle having two sides equal in dimension to a width dimension of said compaction rolls, an uppermost circular opening having a diameter larger than a diagonal dimension of said rectangle, and the inner peripheral wall extending between said lowermost and uppermost openings to thereby substantially merge with peripheral surfaces of the compaction rolls throughout said width; and a tapered screw being disposed in said hopper and said throat and having its lower end portion in registry with said lowermost rectangular opening.

* * * * *